(12) United States Patent
Kondo et al.

(10) Patent No.: US 8,355,197 B2
(45) Date of Patent: Jan. 15, 2013

(54) ELECTROMAGNETIC WAVE OSCILLATING DEVICES

(75) Inventors: Jungo Kondo, Miyoshi (JP); Kenji Aoki, Nagoya (JP); Yuichi Iwata, Nagoya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 172 days.

(21) Appl. No.: 12/851,579

(22) Filed: Aug. 6, 2010

(65) Prior Publication Data

US 2011/0032600 A1     Feb. 10, 2011

(30) Foreign Application Priority Data

Aug. 10, 2009 (JP) ................. 2009-185772

(51) Int. Cl.
*G02F 1/365* (2006.01)
*G02F 1/39* (2006.01)

(52) U.S. Cl. ........................ 359/330; 359/332

(58) Field of Classification Search .................. 359/330
See application file for complete search history.

(56) References Cited

U.S. PATENT DOCUMENTS

| | | | | |
|---|---|---|---|---|
| 7,372,621 | B2 * | 5/2008 | Yoshino et al. | 359/326 |
| 7,589,886 | B1 * | 9/2009 | Chen et al. | 359/332 |
| 2001/0033723 | A1 * | 10/2001 | Yoo | 385/122 |
| 2002/0024718 | A1 * | 2/2002 | Kawase et al. | 359/330 |
| 2008/0298757 | A1 * | 12/2008 | Dunn et al. | 385/122 |
| 2010/0290487 | A1 * | 11/2010 | Wu | 372/21 |

FOREIGN PATENT DOCUMENTS

| | | |
|---|---|---|
| JP | 01-172934 A1 | 7/1989 |
| JP | 09-146131 A1 | 6/1997 |
| JP | 2002-072269 A1 | 3/2002 |
| JP | 2003-324226 A1 | 11/2003 |
| JP | 2007-183316 A1 | 7/2007 |

OTHER PUBLICATIONS

U.S. Appl. No. 12/851,577, filed Aug. 6, 2010, Kondo et al.
U.S. Appl. No. 12/851,580, filed Aug. 6, 2010, Kondo et al.
Jun-ich Nishizawa, "Basis and Applications of Terahertz Wave," Kogyo Chosa Kai, 2005, pp. 105-115.
K. Kawase et al., "Coherent Tunable THz-Wave Generation from $LiNbO_3$ with Monolithic Grating Coupler," Appl. Phys. Lett., vol. 68, No. 18, Apr. 29, 1996, pp. 2483-2485.
Takayuki Shibuya, et al., "Cherenkov-Type Phase-Matched Widely Tunable THz-Wave Generation Using Lithium Niobate Waveguide," The 56th Applied Physics Related Association Conference, Proceedings, 2009 Spring, Tsukuba University, 39p-P1-3.
"New Terahertz Industry," Chapter 3, 3 "Cherenkov-Type Radiation", published Jan. 24, 2011, pp. 35-40.
Koji Suizu, et al., "Extremely Frequency-Widened Terahertz Wave Generation Using Cherenkov-Type Radiation," Optics Express, vol. 17, No. 8, 2009, pp. 676-6681.

* cited by examiner

*Primary Examiner* — Hemang Sanghavi
(74) *Attorney, Agent, or Firm* — Burr & Brown (57) ABSTRACT

An oscillating device includes an oscillating substrate of a non-linear optical crystal and having an incident face where a pump wave and an idler wave are made incident; a first waveguide provided in the oscillating substrate and between the incident face and an interacting part of the pump wave and idler waves; and a second waveguide provided in the oscillating substrate and between the incident face and the interacting part. The first waveguide guides the pump wave and the second waveguide guides the idler wave.

8 Claims, 10 Drawing Sheets

Parametric Wave oscillating condition
(Cherenkov Radiation)

Angle of Incidence $\alpha = 0.06°$ $\theta = 64.8°$   0.14 THz

Calculating condition: n2、n3 are sufficiently thick

ELECTROMAGNETIC WAVE OSCILLATING DEVICES

This application claims the benefit of Japanese Patent Application P2009-185772 filed on Aug. 10, 2009, the entirety of which is incorporated by reference.

BACKGROUND OF THE INVENTION

1. Field of the Invention

The present invention relates to a device of oscillating so-called terahertz wave.

2. Description of Related Art

Terahertz waves are electromagnetic waves generally having a frequency of 0.1 THz to 10 THz, and are expected for basic fields such as physical properties, electrospectroscopy, bioscience, chemistry and pharmaceutical science and for applied fields of atmospheric environmental assessment, security, material test, food test and communication.

As a device for oscillating terahertz waves, it has been developed a backward wave oscillator (BOW) and photomixing in several hundreds GHz band and free electron energy laser, p-Ge laser and quantum cascade laser (QCL) for 1 THz or more. These devices, however, have problems in the miniaturization and improvement of output power.

On the other hand, it has been recently developed a device for oscillating a wide-band terahertz wave with an optical switch or rectification using a femtosecond laser as a light source and applied for time domain spectroscopy (TDS) or the like.

According to "Basis and applications of terahertz wave" published by Kogyo Chosa Kai, 2005 and authored by Junich NISHIZAWA, pages 105 to 115, stimulated Raman scattering (referred to as Polariton stimulated scattering) is caused by Polariton, which is hybrid wave of optically active transverse wave lattice vibration (TO Phonon) and terahertz wave in a crystal. It is thereby strongly generated parametric interactions of three kinds of waves, which are pump wave, idler wave and terahertz wave. As a result, when the pump wave exceeds a predetermined threshold value, idler and terahertz waves having coherency comparable with that of the pump wave are to be oscillated. Polariton stimulated scattering is observed in polar crystals such as $LiNbO_3$, $LiTaO_3$, GaP or the like. $LiNbO_3$ has properties that (1) it is transparent in light wave region in a wide range (0.4 nm to 5.5 μm) and (2) resistive against optical damage, so that terahertz wave can be oscillated at a high output power.

Figure 1:
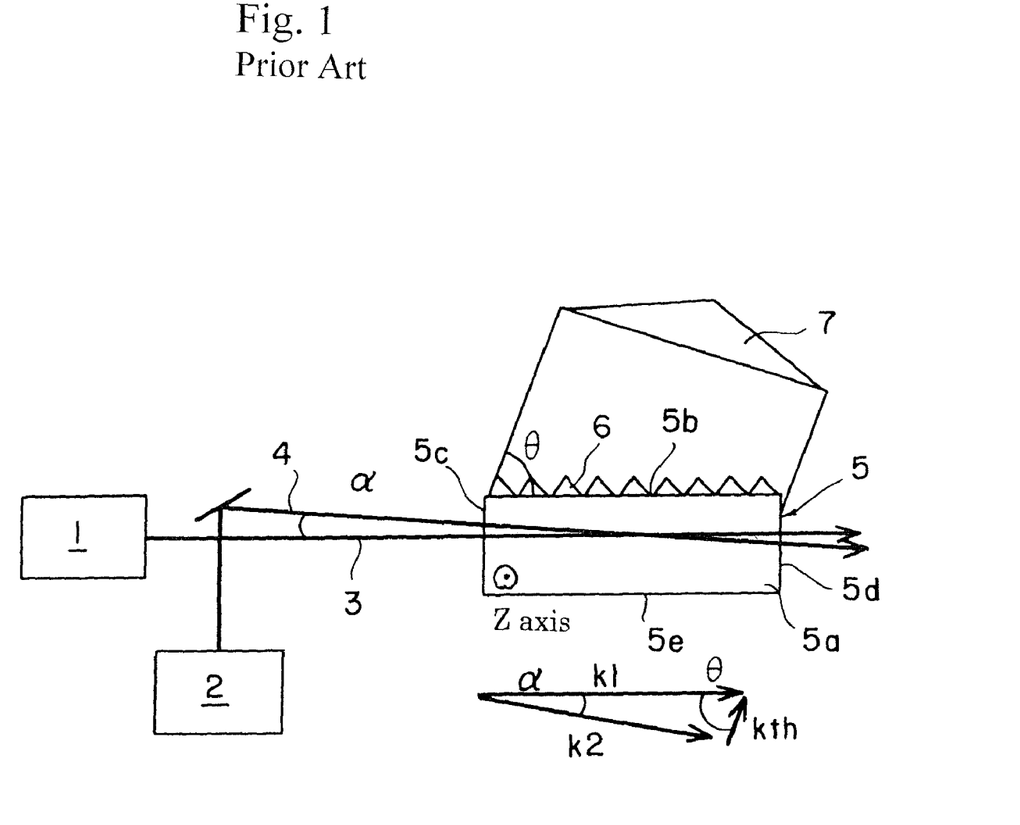
FIG. 1 is a schematic view illustrating an example of an oscillating device.

Japanese Patent Publication No. H09-146131A discloses a device of oscillating terahertz wave using a z-plate of $LiNbO_3$. The principle of oscillation of terahertz wave will be described referring to FIG. 1. FIG. 1 shows a main face $5a$ of a substrate 5 viewed from the above. The substrate 5 includes an incident face $5c$ of pump wave, an emitting face $5d$ of the pump wave, and side faces $5b$ and $5e$. For example, a light source 1 irradiates the pump wave 3 onto the substrate and a light source 2 irradiates an idler wave 4. The pump wave 3 (frequency $\omega1$), idler wave (frequency $\omega2$) and polariton (terahertz wave: frequency $\omega T$) satisfy law of conservation of energy ($\omega1=\omega2+\omega T$) and law of conservation of momentum (noncollinear phase matching condition: $k1=k2+kth$), so that polariton stimulated scattering is observed. In this case, due to the scattering property, the frequencies of the idler wave 4 and terahertz wave 7 are decided depending on the angles $\alpha$ and $\theta$ of the pump wave 3 with respect to the optical axis.

According to the method, typically, the phase matching condition is satisfied when an angle $\alpha$ of wave vector $k1$ of the pump wave 3 and wave vector $k2$ of the idler wave is 0.5° to 1° and the terahertz wave 7 was oscillated (wavelength of 100 to 300 μm, frequency of 3 THz to 1 THz) at a high efficiency. Further, it is described that the terahertz wave is oscillated at an angle of 65 to 66° with respect to the idler wave.

Further, according to K. Kawase, M. Sato, T. Taniuchi, and H. Ito, (Appl. Phys. Lett.,) 68, PP. 2483, 1996, it is described that the intensity of the idler wave as well as that of the terahertz wave can be improved by constituting a resonator with the idler wave (terahertz wave parametric oscillation: TPO). In this case, by changing the angle $\alpha$ in a range of 1 to 2°, the terahertz wave of 0.97 THz to 2.2 THz can be oscillated. A y-plate of $LiNbO_3$ crystal is used and silicon prism is pressed on a surface of the crystal so that (1) the terahertz wave can be drawn to the air at a high efficiency, (2) the fluctuation of the outgoing angle can be reduced (low dependency on wavelength) and (3) the terahertz wave having high directivity can be oscillated.

When such outer resonator is used, the spectrum line width of the oscillated idler wave becomes large (several hundreds GHz), so that it is difficult to generate terahertz wave having a frequency of 0.3 THz or lower generated by difference frequency. Because of this, the following two kinds of laser light sources have been used for generating the terahertz wave having a frequency of, for example, 0.3 THz or lower.

That is, according to Japanese Patent Publication No. 2002-72269A, an exciting laser light having a single frequency is irradiated and an idler wave having a single frequency is used for optical injection to generate terahertz wave having a high output power and whose spectrum line width can be reduced. A silicon prism is, however, used for drawing the terahertz wave.

Figure 2:
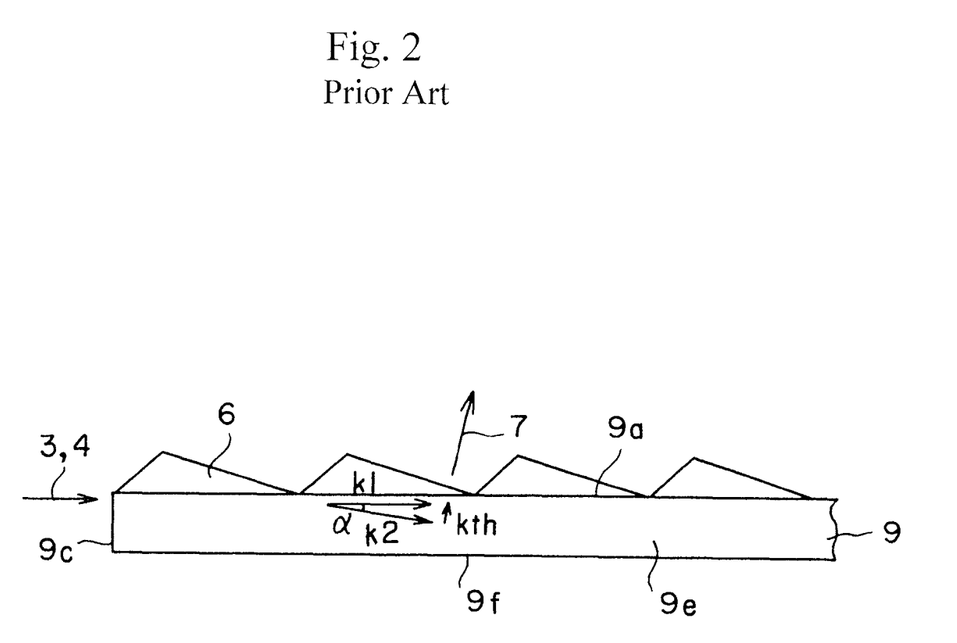
FIG. 2 is a schematic view illustrating an example of an oscillating device.

According to "Cherenkov-type phase-matched widely tunable THz-Wave generation using lithium niobate waveguide" (the 56'th Applied Physics Related Association Conference, Proceedings, 2009 spring, Tsukuba University, 30p-P1-3), a slab optical waveguide of a y-plate or a z-plate of lithium niobate is applied to wide-band tuning of terahertz wave light source. It will be described referring to FIG. 2. A pump wave 3 and idler wave 4 are made incident onto an incident face $9c$ of an optical waveguide of a substrate 9, which is composed of a y-plate made of lithium niobate doped with magnesium oxide. $9a$ represents an upper face, $9f$ represents a bottom face and $9e$ represents a side face. Although it is described that the thickness of the slab optical waveguide is 3.8 μm, the detail is not described. According to the method, (1) the thickness of the slab optical waveguide 9 is made 3.8 μm to confine the exciting light in the slab optical waveguide 9 to reduce the phase mismatch, (2) the thickness of the substrate 9 is lowered to oscillate the terahertz wave from the crystal surface and to avoid the absorption of the terahertz wave 7 into the crystal, and (3) a prism 6 is provided on the upper face $1a$ of the substrate 1 to draw the terahertz wave 7.

SUMMARY OF THE INVENTION

The inventors have specifically studied the method of making a pump wave and an idler wave incident into a non-linear optical crystal from the corresponding light sources, respectively. First, according to the above described prior technical documents, the pump and idler waves oscillated from the respective light sources are propagated in a space using lens systems and made incident onto the crystal.

The inventors have tried to form butt joints between the light sources of the pump and idler waves and the incident face of the crystal substrate, respectively. Further, the inventors have tried the method of connecting optical fibers propagating the pump and idler waves to incident face of the crystal substrate, respectively. When the substrate of, for example, lithium niobate single crystal, is used, however, it is necessary that the angle of the pump and idler waves is made 1 to 2° ("Basis and applications of terahertz wave" published by Kogyo Chosa Kai, 2005 and authored by Jun-ich NISH-IZAWA, pages 105 to 115). Specifically, for generating the terahertz wave having a frequency of 0.3 THz or lower, it is proved that the angle α of the pump and idler waves should be 0.1° or lower.

Therefore, according to the method of directly connecting the laser light source or optical fiber onto the incident face of the crystal substrate and causing the interaction within the substrate, the distance of the laser light sources or optical fibers should be made small. As a result, when the laser light sources or optical fibers are provided and optically connected to the incident face, it is difficult to control the intersecting angle α of the pump and idler waves irradiated from the laser light sources or optical fibers. It has been thus proved to be difficult to improve the output power of the terahertz wave due to the deterioration of the precision.

An object of the present invention is to provide a device of oscillating an electromagnetic wave having a frequency of 0.1 THz to 3 THz from pump and idler waves by parametric effect so that the intersecting angle of the pump and idler waves in an oscillating substrate of a non-linear optical crystal can be controlled at a high precision.

The present invention provides a device of oscillating an electromagnetic wave having a frequency of 0.1 THz to 3 THz from pump and idler waves by parametric effect. The device comprises:

an oscillating substrate comprising a non-linear optical crystal and an incident face on which the pump and idler waves are made incident;

a first waveguide provided in the oscillating substrate and between the incident face and an interacting part of the pump and idler waves, the first waveguide guiding the pump wave; and a second waveguide provided in the oscillating substrate and between the incident face and the interacting part of the pump and idler waves, the second waveguide guiding the idler wave.

The inventors provided the guide waveguides for the pump and idler waves independently on the side of the incident face of the oscillating substrate of a non-linear optical crystal, so that the directions of propagation of the pump and idler waves can be precisely controlled at the end of the interacting part side of the waveguides. According to the construction, it is enough that the ends of the respective waveguides on the incident face side are optically and precisely aligned with outer optical fibers or with light sources, and they do not directly affect the precision of the intersecting angle α of the pump and idler waves. As a result, it is possible to assure a sufficient distance between the incident parts of the pump and idler waves at the side of the incident face of the oscillating substrate. And the intersecting angle α of the pump and idler waves can be precisely controlled within the oscillating substrate without controlling the intersecting angle of the both at the incident face. It is thus possible to oscillate the terahertz wave at a high output power.

DETAILED DESCRIPTION OF THE INVENTION

The present invention provides a device of oscillating an electromagnetic wave having a frequency of 0.1 THz to 3 THz from pump and idler waves by parametric effect.

That is, the pump wave is made incident into an oscillating substrate made of a non-linear optical crystal capable of parametric oscillation, so that the idler and terahertz waves are generated in directions satisfying noncollinear phase matching condition. At this stage, a first laser light having a single frequency as the pump wave is used and a separate second laser light having a single frequency is optically injected in the direction of the generation of the idler wave.

Figure 3:
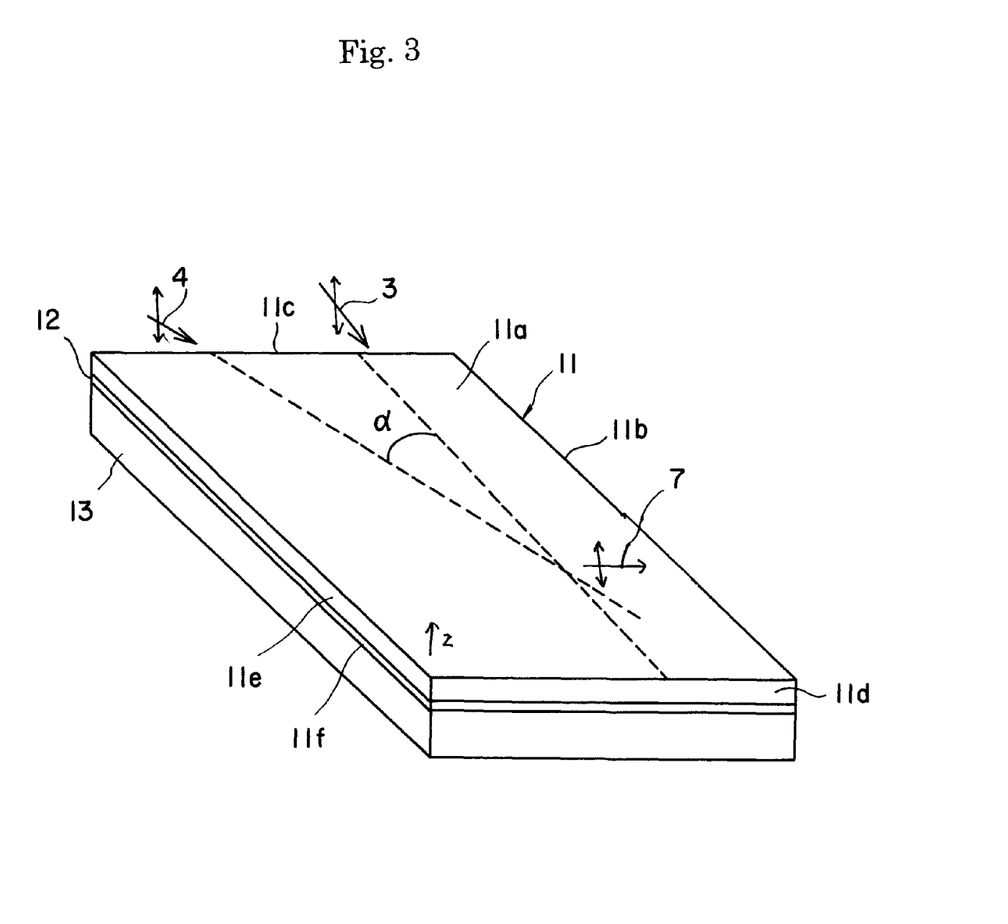
FIG. 3 is a perspective view showing an oscillating device preferably applied to the present invention.
Figure 4:
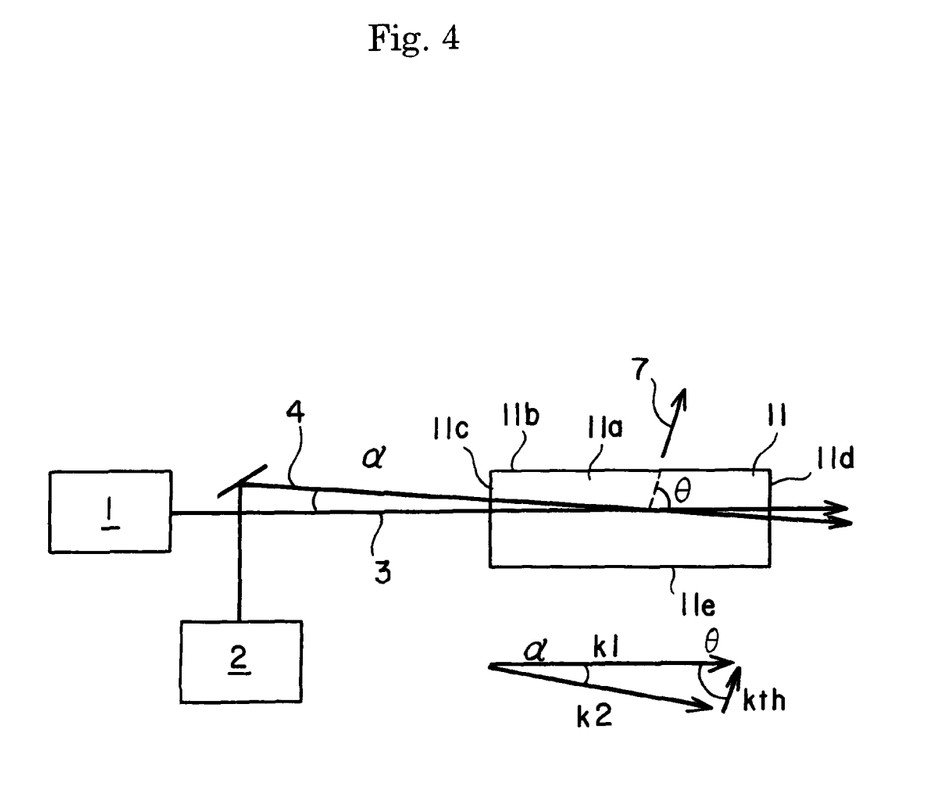
FIG. 4 is a plan view schematically showing the oscillating device of FIG. 3.
Figure 5:
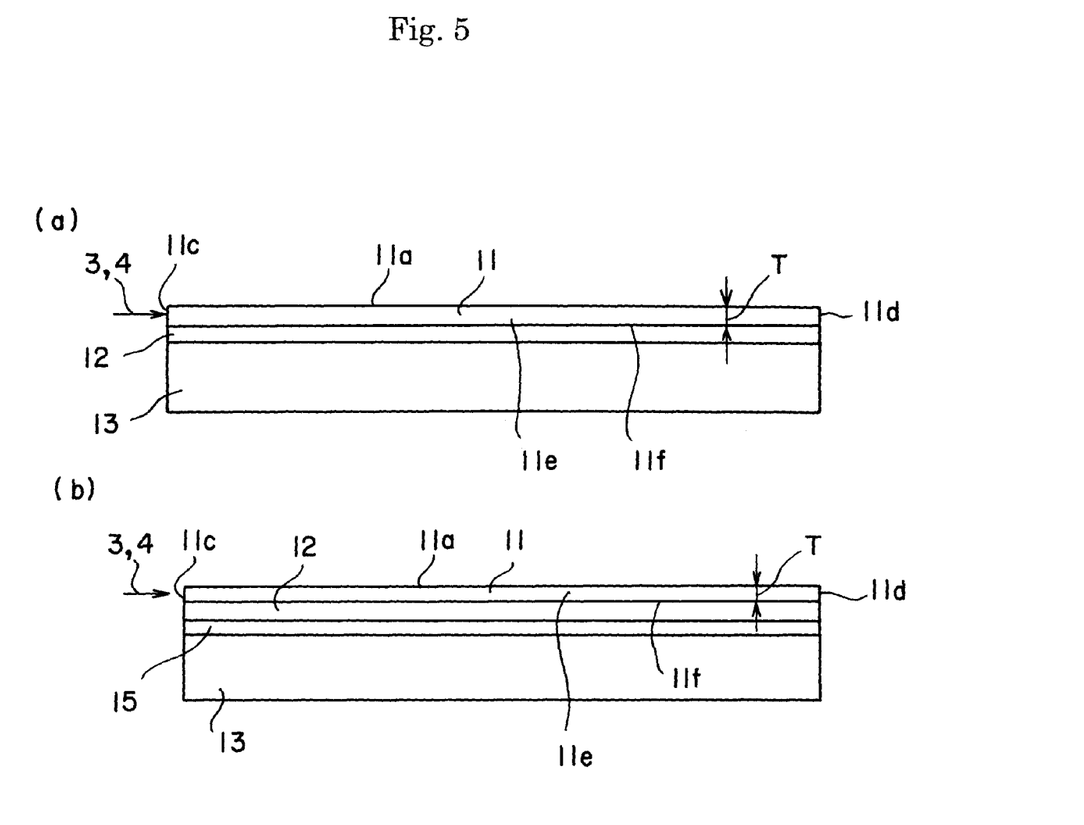
FIGS. 5(a) and 5(b) are side views showing the oscillating device of FIGS. 3 and 4, respectively.

FIGS. 3 to 5 shows an oscillating device preferably used in the present invention.

As shown in FIGS. 3, 4 and 5(a), an oscillating substrate 11 made of a non-linear optical crystal includes an incident face 11c for the pump and idler waves, an emitting face 11d, side faces 11b, 11e, an upper face 11a and a bottom face 11f. The bottom face 11f of the oscillating substrate 11 is joined with a supporting body 13 through an adhesive layer 12.

According to a device of FIG. 5(b), a layer 15 for reflecting terahertz wave is further formed on the joining face of the supporting body 13, so that the leaking of the terahertz wave into the supporting body 13 can be prevented.

For example, the pump wave 3 is irradiated from a light source 1 and the idler wave 4 is irradiated from a light source 2, respectively, onto the substrate. At this stage, it is constructed that the pump wave 3 and idler wave 4 propagate in parallel with the bottom face 11f. Among the pump wave 3 (frequency ω1), idler wave (frequency ω2) and polariton (terahertz wave: frequency ωT), law of conservation of energy (ω1=ω2+ωT) and law of conservation of momentum (Noncolliner phase matching condition: k1=k2+kth) are satisfied so that polariton stimulated scattering is observed. In this case, based on the scattering property, the wavelengths of the idler wave 4 and terahertz wave 7 are decided depending on angles α and θ of the pump wave 3 with respect to the optical axis.

The terahertz wave oscillated from the overlap (interacting) part of the pump and idler waves propagates in parallel with the bottom face 11f of the substrate and at an intersecting angle θ with respect to the pump wave 3. As the thickness T of the substrate 11 is made smaller, cut-off condition is satisfied with respect to the terahertz wave 7 oscillating in parallel with the substrate bottom face 11f. Then, the terahertz wave does not propagate within the crystal and radiated to the outside of the substrate. It is thus possible to prevent the attenuation of the terahertz wave due to the propagation within the substrate and to avoid the necessity of providing a means for drawing the terahertz wave, such as a prism, grating or the like, on the crystal surface.

According to the present embodiment, the oscillating substrate of a z-plate of a non-linear optical crystal is adhered onto the supporting body. In the case that the oscillating substrate of a z-plate is used, for oscillating the terahertz wave by parametric effect, polarized waves vibrating in the direction of the substrate thickness are input as the pump and idler waves, which propagate in parallel with the bottom face of the substrate. The electromagnetic wave (terahertz wave) is oscillated by parametric effect also as polarized wave vibrating in the direction of thickness of the substrate, and propagates in parallel with the bottom face of the substrate. At this stage, it is considered that the thickness of the substrate is made cut-off thickness with respect to the oscillated electromagnetic wave.

As a result, the parametric wave oscillated by parametric effect in the substrate can be drawn to the outside of the crystal without reducing the intensity. Further, it is not necessary to provide an optical means, such as a prism, grating or the like, for drawing the terahertz wave on the crystal surface.

According to the device shown in FIG. 1, the attenuation of the terahertz wave within the substrate cannot be prevented and the provision of the prism or the like on the emitting face 5b is indispensable.

According to the device of "Cherenkov-type phase-matched widely tunable THz-Wave generation using lithium niobate waveguide" (the 56'th Applied Physics Related Association Conference, Proceedings, 2009 spring, Tsukuba University, 30p-P1-3), a y-plate or z-plate is used and the terahertz wave is thus generated in the direction toward the crystal surface. In this case, if the thickness of the substrate is large, the propagation loss inside of the substrate surface would be problematic so that the terahertz wave of a large output power could have not been drawn to the outside of the substrate. Then, the thickness of the substrate is lowered to reduce the propagation length and absorption loss. Further, the silicon prism is pressed onto the substrate surface to draw the terahertz wave to the outside of the substrate at a high efficiency. Therefore, the substrate is not made cut-off with respect to the terahertz wave.

If the oscillating substrate would have been made cut-off with respect to the terahertz wave, the terahertz wave should have been radiated in a predetermined direction to the outside of the oscillating substrate and it should have been unnecessary to provide the silicon prism. Further, if the oscillating substrate would have been made cut-off with respect to the terahertz wave, the terahertz wave should have not been absorbed to result in a loss during the propagation within the oscillating substrate. Therefore, it should have been unnecessary to lower the thickness of the oscillating substrate to 3.8 μm for preventing the absorption of the terahertz wave within the substrate.

According to the present structure, the z-plate is used and the thickness of the substrate is lowered, so that it is made cut-off with respect to the terahertz wave. It is thus possible to draw the terahertz wave to the outside of the substrate without providing a prism of a high refractive index material such as silicon on the upper and lower clads of the substrate.

According to the present structure, it is not necessary to provide such silicon prism, so that the refractive index of the clad with respect to the pump wave can be made smaller than that of the LN substrate. It is thus possible to sufficiently confine the exciting light to increase the optical intensity and to generate the terahertz wave having a higher output power.

Figure 6:
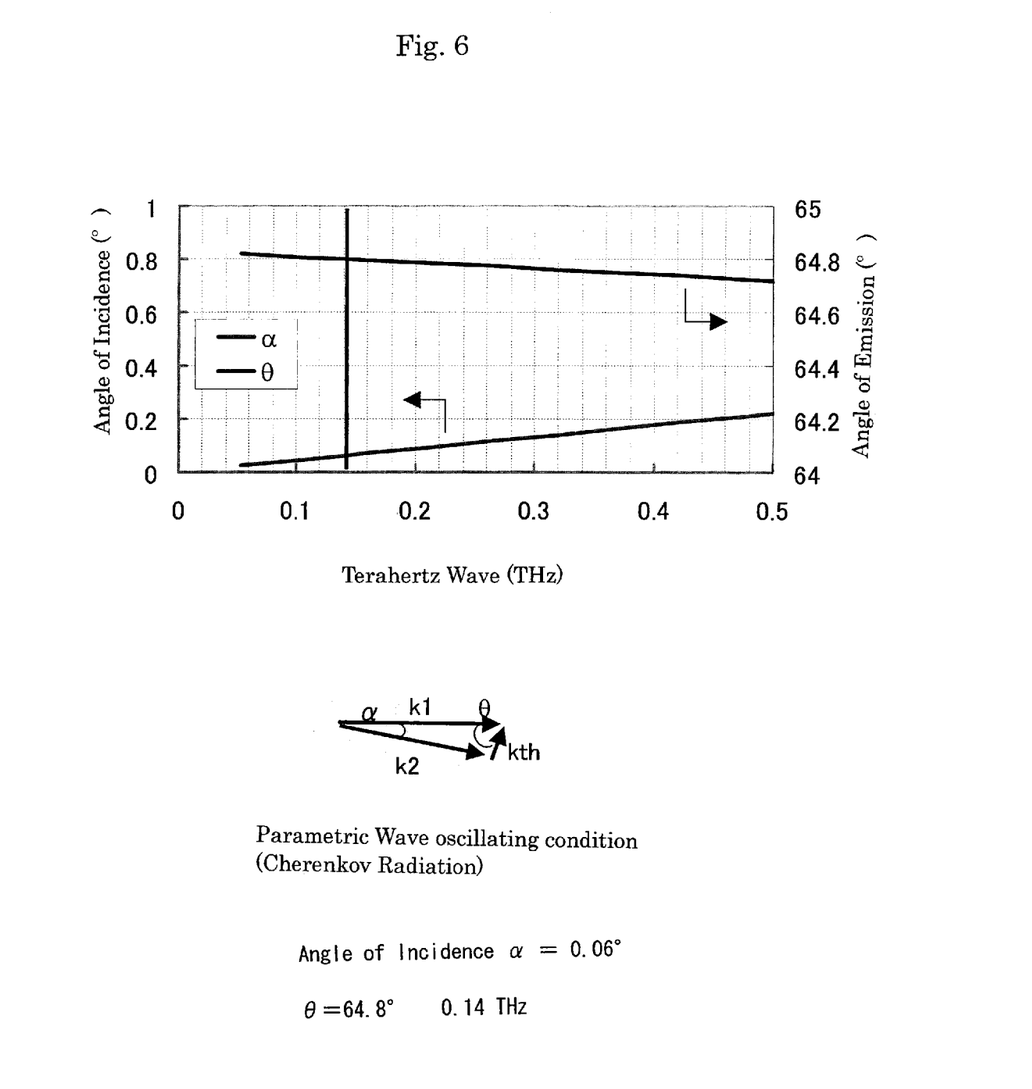
FIG. 6 is a graph showing the relationship of the frequency of terahertz wave, an incident angle α and an emitting angle θ.

FIG. 6 shows the relationship of the frequency of the terahertz wave, incident angle α and emitting angle θ. FIG. 6 shows the results of simulation under the following condition.

According to Polariton stimulated scattering process, it is required that the laws of conservation of energy and momentum are satisfied among the pump, idler and terahertz waves, as described above. Based on this, the frequencies (wavelengths) of the idler and terahertz waves were calculated by the law of conservation of energy, provided that the wavelength of the pump wave is 1064 nm. Further, the refractive indices for the respective wavelengths are calculated by Sellmeier equation and the angle α of incidence and angle θ of emitting are calculated by the law of conservation of momentum.

As can be seen from the results, the incident angle α is small in the region of terahertz wave, and a distance of the pump and idler waves becomes inevitably small. It is thus difficult to appropriately adjust the distances of the light sources and the optical fibers at the incident face 11c. Further, it becomes difficult to adjust the intersecting angle α of the pump and idler waves at the incident face.

Figure 7:
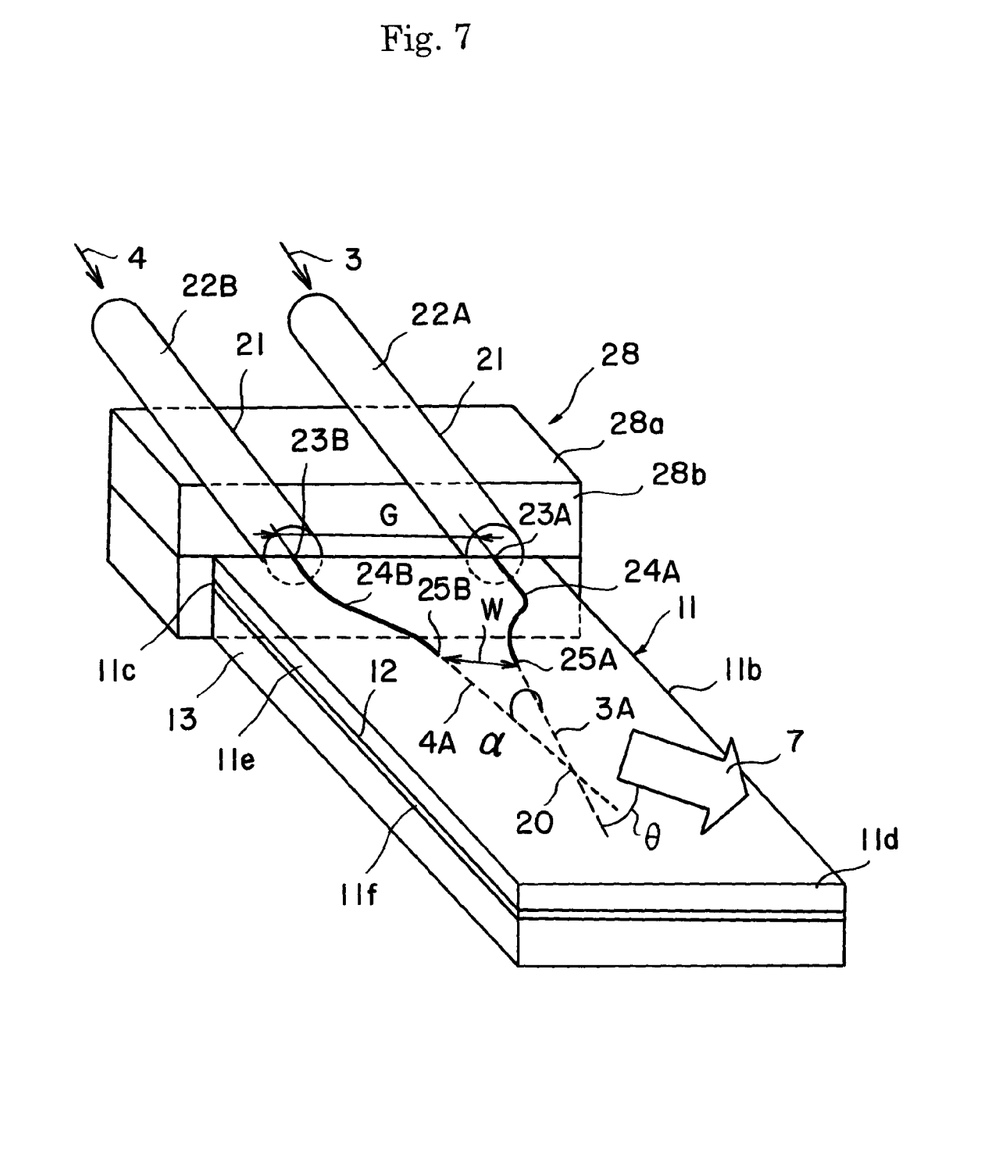
FIG. 7 is a perspective view showing a device according to an embodiment of the present invention.
Figure 8:
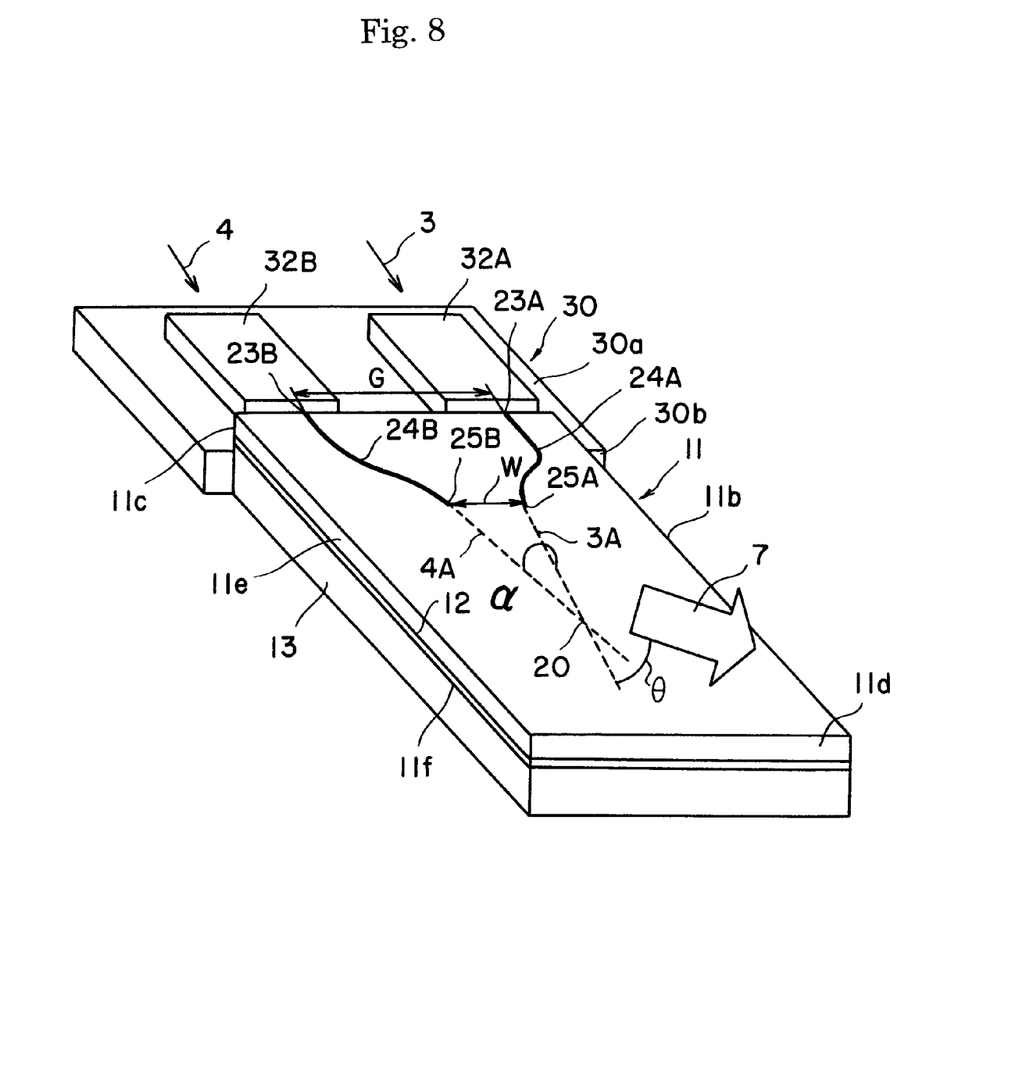
FIG. 8 is a perspective view showing a device according to another embodiment of the present invention.

FIGS. 7 and 8 are perspective views showing devices according to embodiments of the present invention, respectively. The devices have the oscillating substrate 11, adhesive layer 12, supporting body 13 and optionally the layer for reflecting the electromagnetic wave as shown in FIGS. 3 to 5.

According to the example of FIG. 7, an optical fiber array 28 is fixed at a position opposing the incident face 11c of the oscillating substrate 11. A pair of grooves 21 are formed on an upper face 28a of the optical fiber array 28 for fixing the respective optical fibers in the grooves. A first optical fiber 22A for the pump wave and a second optical fiber 22B for the idler wave are fixed in the optical fiber array 28. The end faces of the optical fibers 22A, 22B are contacted with the incident face 11c of the oscillating substrate.

In the oscillating substrate 11, the first waveguide 24A for the pump wave and the second waveguide 24B for the idler wave are provided between the incident face 11c and the interacting part 20. According to the present example, one end 23A of the waveguide 24A extends to the incident face 11c, and one end 23B of the waveguide 24B extends to the incident face 11c. Then, the core at the end face of the optical fiber 22A is contacted with and optically connected to one end 23A of the waveguide 24A, and the core at the end face of the optical fiber 22B is contacted with and connected to one end 23B of the waveguide 24B.

On the other hand, the other ends 25A and 25B of the waveguides 24A and 24B are precisely aligned so as to oppose the interacting part 20. Such precise positioning can be made by the alignment during the formation of the waveguide.

The pump wave 3 and idler wave 4 propagate toward the incident face 11c with the respective fibers 22A and 22B, connected to the respective waveguides 24A and 24B, and irradiated from end parts 25A and 25B of the waveguides into the inside of the oscillating substrate 11 as 3A and 4A. Then, the pump and idler waves are intersected at an intersecting angle α and interacted with each other. The terahertz wave is thereby emitted.

Then, according to the example shown in FIG. 3, the intersecting angle of the pump wave 3 and idler wave 4 is decided at the incident face 11c, and the distance of the pump wave 3 and idler wave 4 is decided based on the angle α and the dimension of the substrate. When the distance of the pump and idler waves is small, the positioning of the optical fibers 22A and 22B becomes difficult and the precision of the intersecting angle α can be hardly improved.

Contrary to this, according to the example of FIG. 7, the position of the interacting part 20 and intersecting angle are decided by the distance W and angle of the end parts 25A and 25B of the waveguides 24A and 25B. It is thus possible to precisely control the position of the interacting part and intersecting angle, so that the oscillating intensity of the terahertz wave can be improved.

According to the example of FIG. 8, a contact face 30b of a substrate 30 is fixed onto the incident face 11c of the oscillating substrate 11. A pair of laser light sources 32A, 32B are mounted on an upper face 30a of the substrate 30.

In the oscillating substrate 11, a first waveguide 24A for the pump wave and a second waveguide 24B for the idler wave are provided between the incident face 11c and interacting part 20. According to the present example, one end 23A of the waveguide 24A extends to the incident face 11c, and one end 23B of the waveguide 24B extends to the incident face 11c. Then, a laser light source 32A is contacted with and optically connected to the one end 23A of the waveguide 24A, and a laser light source 32B is contacted with and optically connected to the one end 23B of the waveguide 23B.

On the other hand, the other ends 25A and 25B of the waveguides 24A and 24B are precisely positioned so as to oppose the interacting part 20, respectively. Such precise positioning can be made by alignment during the formation of the waveguides.

The pump and idler waves are oscillated from the laser light sources 32A and 32B, respectively, connected to the waveguides 24A and 24B, respectively, and then irradiated from the ends 25A and 25B of the waveguides as 3A and 4A, respectively, toward the inside of the oscillating substrate 11. Then, the pump and idler waves are intersected at the intersecting angle α and interacted with each other. The terahertz wave 7 is thereby emitted.

According to the present example, the position of the interacting part 20 and intersecting angle are decided based on the distance W and angle of the ends 25A and 25B of the waveguides 24A and 24B. The precise control of the position of the interacting part and intersecting angle is thus easy, so that the oscillating intensity of the terahertz wave 7 can be improved.

The non-linear optical crystal is not limited as far as it is capable of oscillating terahertz wave by parametric effect, and the crystal includes a dielectric material such as lithium niobate, lithium tantalate, solid solution of lithium niobate and lithium tantalate, KTP and KN. Further, the crystal may be doped with magnesium oxide or the like for preventing optical damage. Further, the lithium niobate may be of congruent composition as well as stoichiometric composition.

A z-plate of a non-linear optical crystal means a substrate in which the z-axis of the crystal is aligned in the direction of the normal line (direction perpendicular to) the substrate 5. In the case of a dielectric material such as lithium niobate and lithium tantalate, the non-linear optical constant d33 is the largest. The polarization direction of the inputted waves (pump and idler waves) are made the direction of z-axis to oscillate electromagnetic wave of z-axis. According to the present embodiment, the thickness of the substrate is made 20 µm or smaller to form a slab type waveguide with respect to the inputted lights. It is thus possible to generate the terahertz wave at a high efficiency and to improve the power density by propagating the lights in TM mode in the waveguide.

Figure 10:
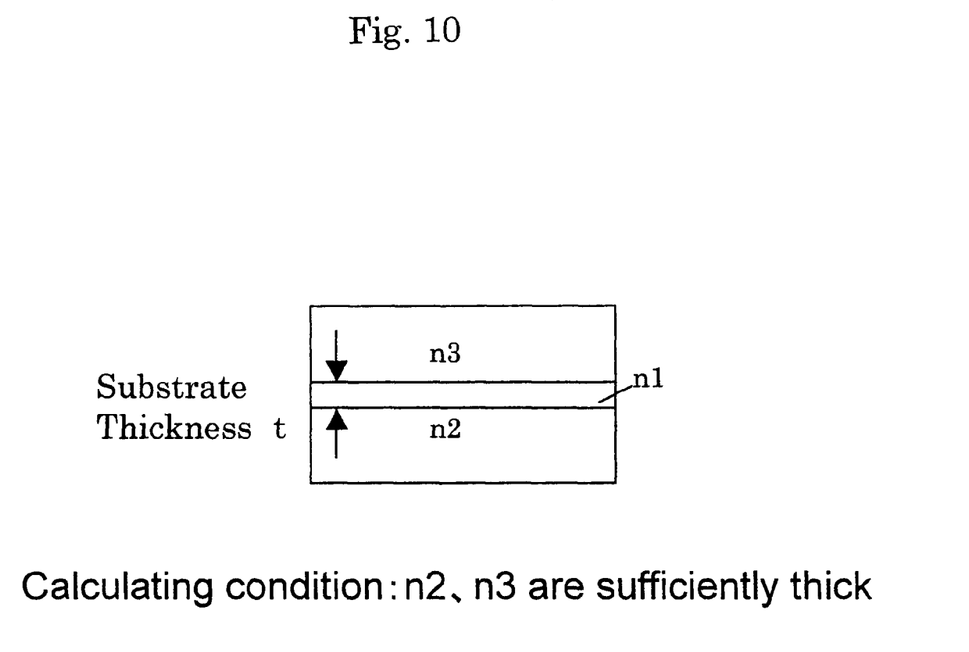
FIG. 10 is a schematic view showing a calculating model of structure of refractive index.

According to a structure of indices shown in FIG. 10 (n1 represents a refractive index of core, and n2 and n3 represent refractive indices of clad), in the case of TM mode propagation applied in the present embodiment, the thickness Tc required for cut-off condition is represented by the following formula (m represents mode order).

$$Tc = \frac{\lambda_{THz}}{2\pi\sqrt{n_1^2 - n_2^2}} \cdot \left[\tan^{-1}\left(\frac{n_1^2}{n_3^2}\sqrt{\frac{n_2^2 - n_3^2}{n_1^2 - n_2^2}} + m\pi\right)\right]$$

When the oscillating substrate is made of lithium niobate, for example, the substrate thickness Tc for the cut-off becomes 144 µm to 4.8 µm for the frequency range of 0.1 THz to 3 THz.

According to the present embodiment, the pump wave as exciting light source and idler wave can be propagated in the slab waveguide for generating the terahertz wave at a high efficiency. On the viewpoint, the thickness of the oscillating substrate may preferably be 20 µm or smaller. Most preferably, the thickness may be 4 µm or larger and 15 µm or smaller for connecting the exciting light source to the oscillating substrate efficiently and for propagating it at a still lower loss.

Although the material of the supporting body is not particularly limited, a dielectric material such as lithium niobate, lithium tantalate, solid solution of lithium niobate and lithium tantalate, KTP and KN, a semiconductor such as GaP and ZnSe, and a glass such as quartz glass are listed.

Further, on the viewpoint of improving the reliability and matching of thermal expansion with that of the oscillating substrate, the supporting body may preferably be made of the same material as the oscillating substrate.

The adhesive adhering the oscillating substrate and supporting body is preferably made of a material having a dielectric constant lower than that of the oscillating substrate. Specifically, the refractive index of the adhesive may preferably be 2 or lower. Although the specific examples of the adhesive is not particularly limited, an epoxy series resin adhesive, thermosetting type resin adhesive, ultraviolet curable type resin adhesive, and Alon Ceramics C (thermal expansion coefficient of $13 \times 10^{-6}$/K) may be listed.

Although the thickness of the adhesive is not particularly limited, the thickness may preferably be 0.5 µm or larger on the viewpoint of preventing the leakage of the terahertz wave.

The light sources for the pump and idler waves may preferably be a semiconductor laser or a solid laser excited by the semiconductor laser (YAG, $YVO_4$, YLF or the like).

According to the embodiment in which the pump and idler waves from the laser light sources are directly made incident into the respective waveguides as shown in FIG. 8, the laser light sources may be directly connected to the respective waveguides by butt joints, or may be connected with a lens. Further, according to the embodiment in which the pump and idler waves from the laser light sources are transmitted using optical transmitting devices such as an optical fiber, ferule or the like as shown in FIG. 7, the end face of the optical transmitting device may be connected to the waveguide by butt joint, or connected with a lens.

The frequencies of the pump, idler and terahertz waves, α and θ are decided by the parametric oscillating condition. Typically, the wavelength of the pump wave may preferably be 800 nm to 1600 nm, and a may preferably be 0.04° to 4°. In this case, θ is in a range of 65 to 62°.

The waveguides for guiding the pump and idler waves may be those utilizing metal diffusion such as Ti diffusion, proton exchange waveguide or ridge type waveguide.

Further, the distance W at the end parts on the side of the interacting part 20 of the respective waveguides can be decided depending on α and the distance from the interacting part. According to the present invention, it is possible to precisely pattern the waveguide even if W is small and thereby to adjust W at a high precision. Typically, W may be 10 to 250 μm.

EXAMPLES

Reference Example

Figure 9:
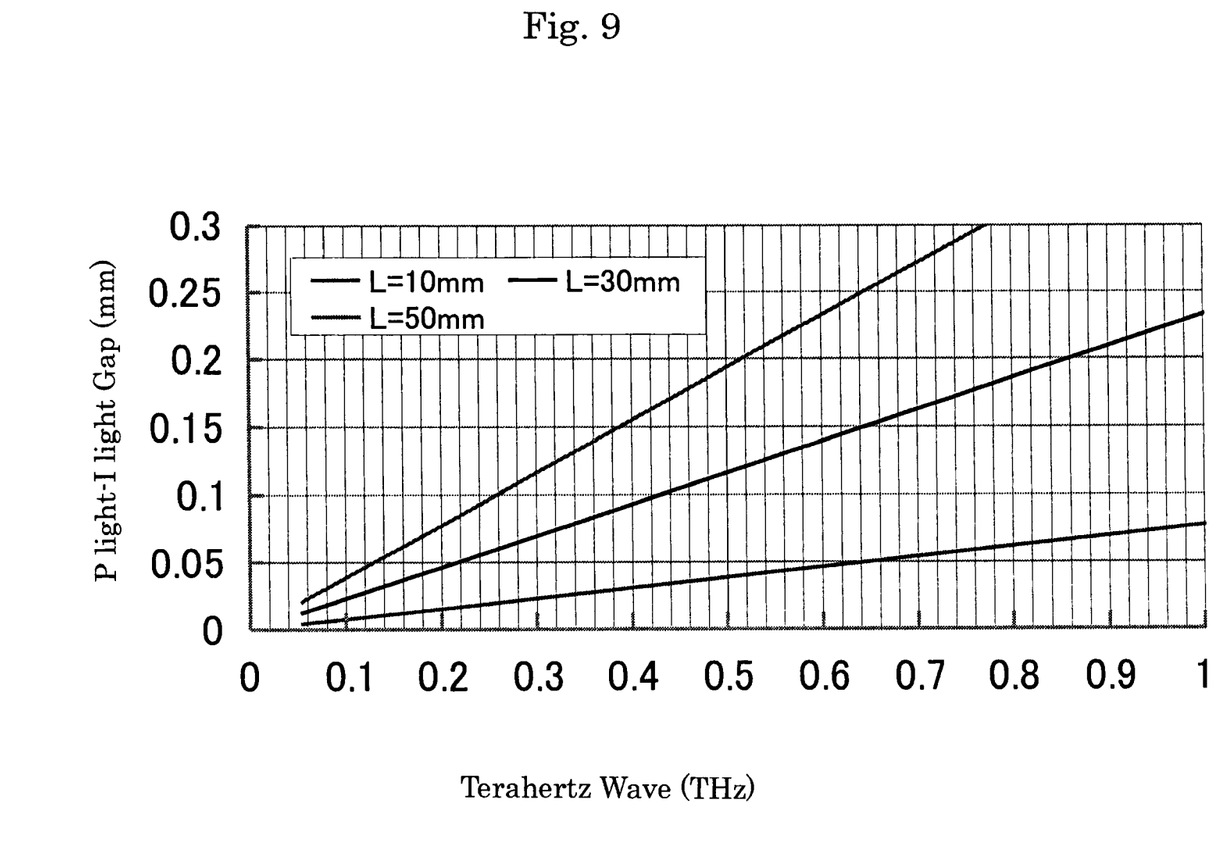
FIG. 9 is a graph showing the relationship of P light-I light gap and the frequency of the terahertz wave.

In the case that the terahertz wave oscillating device shown in FIGS. 3 to 5 is produced, the distance G of the pump wave 3 and idler wave 4 is decided as shown in FIG. 9 with respect to the distance L to the crossing point 20 of the both lights. It is now provided that the oscillating substrate is made of MgO-doped lithium niobate single crystal and has a thickness of 10 μm. As can be seen from the figure, G can be made 250 μm or more in the case that L is 50 mm and the frequency is 0.7 THz or higher, so that the pump and idler waves can be supplied by positioning two optical fibers using an optical fiber array or the like. However, in the case that L is 50 mm or smaller and at a frequency lower than 0.7 THz, it is difficult to perform the connection with butt joint or with optical axis connection using a lens having a short focal length (30 mm or shorter) of an optical fiber part and semiconductor laser.

Inventive Example 1

The oscillating device is produced similarly as the Reference Example. However, as shown in FIG. 7, the waveguides 24A and 24B are produced by titanium inner diffusion. Further, the optical fiber array was connected and aligned to the optical fibers. The pump and idler waves were connected to the optical fibers. The length of the device was made 50 mm. The oscillating substrate was made of lithium niobate single crystal and the thickness was made 10 μm. W was changed in a range of 40 to 250 μm and G was made 250 μm. The idler wave was made a wavelength valuable laser to change the wavelength to generate the terahertz wave having a wavelength of 0.11 THz to 0.7 THz. In the case that the length of the device was 10 mm, W was changed similarly to confirm the generation of the terahertz wave having a wavelength of 0.11 THz to 3 THz. Further in the case that the length of the device was 30 mm, the terahertz wave having a wavelength of 0.11 THz to 1 THz was successfully confirmed in a similar manner.

Inventive Example 2

The oscillating device is produced similarly as the Reference Example. However, as shown in FIG. 8, the waveguides 24A and 24B are produced by titanium inner diffusion. The semiconductor laser light sources for the pump and idler waves were connected and aligned by butt joint. The length of the device was made 50 mm. The oscillating substrate was made of lithium niobate single crystal and the thickness was made 8 μm. W was changed in a range of 40 to 250 μm as the Inventive Example 1. G was made 1 mm. The idler wave was made a wavelength valuable laser to change the wavelength to generate the terahertz wave having a wavelength of 0.11 THz to 3 THz. In the case that the length of the device was 10 mm or 30 mm, the generation of the terahertz wave could be confirmed in a similar manner.

DESCRIPTION OF REFERENCE NUMERALS

| 3 | Pump wave, | 3A | Pump wave emitted from waveguide, |
|---|---|---|---|
| 4 | Idler wave, | 4A | Idler wave emitted from waveguide |
| 7 | Terahertz wave, | 11 | Oscillating substrate, |
| 11a | Upper face of oscillating substrate, | | |
| 11c | Incident face of oscillating substrate, | | |
| 11f | Bottom face of oscillating substrate, | | |
| 12 | Adhesive layer, | 13 | Supporting substrate, |
| 15 | Film for reflecting electromagnetic wave, | | |
| 20 | Interacting part, | 22A | First optical transmitting device, |
| 22B | Second optical transmitting device, | | |
| 23A | End face on the side of incident face of first waveguide 24A, | | |
| 23B | End face on the side of incident face of second waveguide 24B, | | |
| 24A | First waveguide, | 24B | Second waveguide, |
| 25A | End part on the side of interacting part of first waveguide 24A, | | |
| 25B | End part on the side of interacting part of second waveguide 24B, | | |
| 28 | Optical fiber array, | | |
| W | Distance of waveguides at end parts on the side of interacting part, | | |
| α | Angle of incidence, | | |

Although the present invention has been described with reference to particular embodiments, the invention is not limited thereto and various changes and modification may be made without departing from the scope of the appended claims.

The invention claimed is:

1. A device for oscillating an electromagnetic wave having a frequency of 0.1 THz to 3 THz from pump and idler waves by parametric effect, the device comprising:
   an oscillating substrate comprising a non-linear optical crystal and an incident face on which said pump and idler waves are made incident;
   a first waveguide provided in said oscillating substrate and between said incident face and an interacting part of said pump and idler waves, said first waveguide guiding said pump wave and further comprising an incident side end and an emitting side end for said pump wave; and
   a second waveguide provided in said oscillating substrate and between said incident face and said interacting part of said pump and idler waves, said second waveguide guiding said idler wave and further comprising an incident side end and an emitting side end for said idler wave,
   wherein said pump wave is irradiated from said emitting side end of said first waveguide into said oscillating substrate,
   wherein said idler wave is irradiated from said emitting side end of said second waveguide into said oscillating substrate, and
   wherein said pump wave and said idler wave irradiated into said oscillating substrate intersect at said interacting part at a predetermined angle to oscillate said electromagnetic wave.

2. The device of claim 1, wherein a first light source oscillating said pump wave and a second light source oscillating said idler wave are optically connected to said incident face.

3. The device of claim 1, wherein a first optical transmitting device oscillating said pump wave and a second optical transmitting device oscillating said idler wave are optically connected to said incident face.

4. The device of claim 1, wherein said non-linear optical crystal is selected from the group consisting of lithium niobate, lithium tantalate and solid solution of lithium niobate and lithium tantalate.

5. The device of claim 1, wherein said emitting side end of said first waveguide and said emitting side end of said second waveguide are aligned with each other so that said pump and idler waves are directed toward said interacting part.

6. The device of claim 1, wherein said emitting side end of said first waveguide and said emitting side end of said second waveguide are separated from each other by a distance of 10 to 250 μm.

7. A device for oscillating an electromagnetic wave having a frequency of 0.1 THz to 3 THz from pump and idler waves by parametric effect, the device comprising:

an oscillating substrate comprising a non-linear optical crystal and an incident face on which said pump and idler waves are made incident;

a first waveguide provided in said oscillating substrate and between said incident face and an interacting part of said pump and idler waves, said first waveguide guiding said pump wave;

a second waveguide provided in said oscillating substrate and between said incident face and said interacting part of said and idler waves, said second waveguide guiding said idler wave;

a supporting body; and an adhesive layer adhering said supporting body and said oscillating substrate, wherein said oscillating substrate has a thickness to be cut-off with respect to said electromagnetic wave oscillated by parametric effect when said pump and idler waves propagate in parallel with said bottom face.

8. The device of claim 7, further comprising a film reflecting said electromagnetic wave on a surface on the side of said adhesive layer of said supporting body.

* * * * *